United States Patent
Van de Maele

(10) Patent No.: US 8,767,753 B2
(45) Date of Patent: Jul. 1, 2014

(54) SYSTEM, METHOD AND DEVICE FOR PROVIDING NETWORK COMMUNICATIONS

(75) Inventor: Wim Van de Maele, Bissegem (BE)

(73) Assignee: Semiconductor Components Industries, LLC, Phoenix, AZ (US)

( * ) Notice: Subject to any disclaimer, the term of this patent is extended or adjusted under 35 U.S.C. 154(b) by 208 days.

(21) Appl. No.: 13/218,700

(22) Filed: Aug. 26, 2011

(65) Prior Publication Data
US 2013/0051435 A1 Feb. 28, 2013

(51) Int. Cl.
*H04L 12/28* (2006.01)
*H04L 12/46* (2006.01)
*H04L 12/40* (2006.01)
*H04L 12/12* (2006.01)

(52) U.S. Cl.
CPC .............. *H04L 12/4625* (2013.01); *Y02B 60/32* (2013.01); *H04L 12/40169* (2013.01); *H04L 12/12* (2013.01); *Y02B 60/34* (2013.01)
USPC .......................................................... 370/401

(58) Field of Classification Search
USPC .......................................... 370/419, 451, 401
See application file for complete search history.

(56) References Cited

U.S. PATENT DOCUMENTS

| | | | |
|---|---|---|---|
| 6,763,060 B1 | 7/2004 | Knapp | |
| 7,245,631 B2 | 7/2007 | Sano et al. | |
| 7,701,943 B2 | 4/2010 | Harris et al. | |
| 7,783,908 B2 | 8/2010 | Bogovac | |
| 2005/0102430 A1 | 5/2005 | Huber et al. | |
| 2007/0102998 A1 | 5/2007 | Jordan et al. | |
| 2007/0230484 A1* | 10/2007 | Hu et al. | 370/401 |
| 2008/0063006 A1* | 3/2008 | Nichols | 370/451 |

\* cited by examiner

*Primary Examiner* — Mohammad Anwar
(74) *Attorney, Agent, or Firm* — Robert F. Hightower

(57) ABSTRACT

A system and device for providing communications between two or more buses is provided. In one embodiment, the device may comprise a transfer component having a first port configured to be connected to a first bus and a second port configured to be connected to a second bus. The transfer component may be operable in a first operational mode in which signals received via the first port are output the second port and operable in a second operational mode in which signals received via the first port are not output the second port. The device may include a controller communicatively coupled to the transfer component to transition the transfer component between the first and second operational modes.

17 Claims, 5 Drawing Sheets

SYSTEM, METHOD AND DEVICE FOR PROVIDING NETWORK COMMUNICATIONS

BACKGROUND OF THE INVENTION

The present invention relates, in general, to communication networks, and more particularly to partitioning network elements.

In a communication system having a plurality of communication nodes connected to a bus, typically all the nodes monitor the messages on the bus. Some such communication nodes may operate in a first "normal" operational mode and in second, low power mode, sometimes referred to as "sleep" mode, to reduce power consumption. While operating in the low power mode, each time a message is communicated over the bus all of the communication nodes typically must "wake up" from low power mode to process the message—even though the message may be intended for only a subset (or only one) of the communication nodes. Each time each node wakes up from the lower power mode increases the power consumption of the network. Because all of the nodes connected to the bus typically must wake up each time a message is communicated over the bus, some (or many) of the nodes may be unnecessarily waking up from sleep mode (because the messages are not intended for such communication nodes), thereby unnecessarily increasing power consumption of the network.

Accordingly, it may be desirable to have a device, system, and method for reducing the number of communication nodes that are woken up from sleep mode to process messages intended for other communication nodes to thereby consume less power.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and implementations or embodiments shown. In the drawings.

Figure 1:
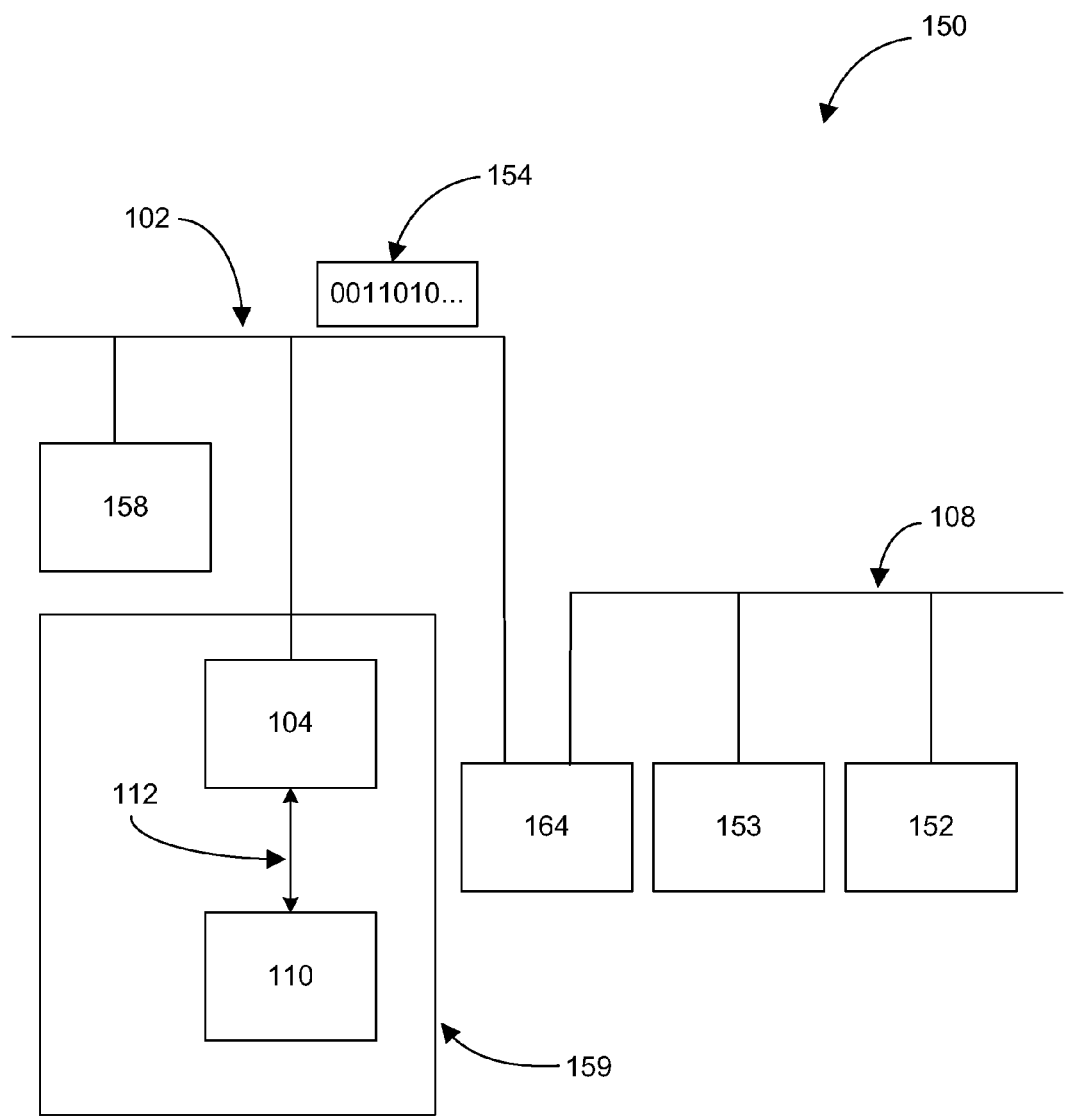
FIG. 1 is a block diagram of a network in accordance with an example embodiment of the present invention.

For simplicity and clarity of the illustration, elements in the figures are not necessarily to scale, are only schematic and are non-limiting, and the same reference numbers in different figures denote the same elements, unless stated otherwise. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or anode of a diode, and a control electrode means an element of the device that controls current flow through the device such as a gate of an MOS transistor or a base of a bipolar transistor. It will be appreciated by those skilled in the art that the words "during", "while", and "when" as used herein relating to circuit operation are not exact terms that mean an action takes place instantly upon an initiating action but that there may be some small but reasonable delay, such as a propagation delay, between the reaction that is initiated by the initial action. Additionally, the term "while" means that a certain action occurs at least within some portion of a duration of the initiating action. The use of the word "approximately" or "substantially" means that a value of an element has a parameter that is expected to be close to a stated value or position. However, as is well known in the art there are always minor variances that may prevent the values or positions from being exactly as stated. It is well established in the art that variances of up to at least ten percent (10%) (and up to twenty percent (20%) for semiconductor doping concentrations) are reasonable variances from the ideal goal of exactly as described. When used in reference to a state of a signal, the term "asserted" means an active state of the signal and "negated" means an inactive state of the signal. The actual voltage value or logic state (such as a "1" or a "0") of the signal depends on whether positive or negative logic is used. Thus, "asserted" can be either a high voltage or a high logic or a low voltage or low logic depending on whether positive or negative logic is used and "negated" may be either a low voltage or low state or a high voltage or high logic depending on whether positive or negative logic is used. Herein, a positive logic convention is used, but those skilled in the art understand that a negative logic convention could also be used. The terms "first", "second", "third" and the like in the Claims or/and in the Detailed Description, are used for distinguishing between similar elements and not necessarily for describing a sequence, either temporally, spatially, in ranking or in any other manner. It is to be understood that the terms so used are interchangeable under appropriate circumstances and that the embodiments described herein are capable of operation in other sequences than described or illustrated herein. For clarity of the drawings, doped regions of device structures may be illustrated as having generally straight line edges and precise angular corners. However, those skilled in the art understand that due to the diffusion and activation of dopants the edges of doped regions generally may not be straight lines and the corners may not be precise angles.

In addition, the description illustrates a cellular design (where the body regions may be a plurality of cellular regions) instead of a single body design (where the body region may be comprised of a single region formed in an elongated pattern, typically in a serpentine pattern). However, it is intended that the description is applicable to both a cellular implementation and a single base implementation.

DETAILED DESCRIPTION

In the following description, for purposes of explanation and not limitation, specific details are set forth, such as particular signals, circuits, circuit arrangements, thresholds, components, operation modes, techniques, protocols, hardware arrangements, nodes, either internal or external, etc., in order to provide a thorough understanding of the present invention.

However, it will be apparent to one skilled in the art that the present invention may be practiced in other embodiments that depart from these specific details. Detailed descriptions of well-known signals, circuits, thresholds, components, operation modes, nodes, techniques, protocols, and hardware arrangements, either internal or external, etc., are omitted so as not to obscure the description.

Embodiments of the present invention may selectively connect and disconnect two or more communication buses to thereby selectively communicate messages between the various buses. Communication nodes connected to a disconnected bus may be awaken from a low power mode (sleep mode) less often than if such nodes received all messages communicated all the buses of the network. Such connection or disconnection of a bus may be facilitated by a transfer communication node that is coupled to, and selectively transfers messages between, two (or more) communication buses. The transfer communication mode may be responsive to receipt of one or more control messages to transition between a first state, in which messages are transferred between the two (or more) buses, and a second state, in which messages are not transferred between the buses.

The transfer communication node that selectively connects the buses of one example embodiment includes a transfer component and a controller. The transfer component may have a first port configured to be connected to a first bus and a second port configured to be connected to a second bus. The transfer component may be operable in a first operational mode in which a signal, which may comprise a message, received by the first port is transferred to (and output by) the second port (and vice versa). The transfer component may be operable in a second operational mode in which a signal, which may comprise a message, received at the first port is not transferred to the second port for output (and vice versa). The controller, which may include a processor and memory, may be communicatively coupled to the transfer component and be configured to receive messages communicated over the first bus that are received via the first port and to receive messages communicated over the second bus that are received via the second port. The controller may be configured to process the received messages and, based on the processing, transition the transfer component between the first operational mode and the second operational mode.

FIG. 1 is a block diagram of a network 150 in accordance with an example embodiment of the present invention. Communication nodes 158 and 159 are connected to a first bus 102. Communication nodes 152 and 153 are connected to a second bus 108. Transfer communication node 164 (sometimes referred to herein as "transfer node") includes a first port that connected to the first bus 102 and includes a second port that is connected to the second bus 108. Communication node 159 may include a transceiver 104, coupled to a controller 110 (that may include a processor and memory) to send and/or receive a signals, such as, for example, a Controller Area Network (CAN) signal, over the first bus 102. Communication nodes 152, 153, and 158 may have the same functional blocks, and construction, as communication node 159. Communication nodes 152, 153, 158, and 159 may operate in a first "normal" operational mode and in second, low power mode, sometimes referred to as "sleep" mode (or hibernation mode), to reduce power consumption. While operating in the low power mode, each time a message is communicated over the bus all of the communication nodes typically must "wake up" from low power mode to process the message. The transfer nodes and communication nodes described herein may be configured to communicate CAN signals (or messages) and/or a LIN (Local Interconnect Network) signals (or messages). The physical CAN signals may be converted to digital signals by the transceivers of each node, which are then provided to the controller. Either or both buses also may have additional communication nodes similar to communication node 159.

The transfer node 164 may have two operational modes. In the first operational mode, signals received at the first port are transferred to and output the second port (and vice versa) so that the first bus 102 is communicatively coupled to or, in effect, "connected" to the second bus 108. In the second operational mode, signals received at the first port are not output the second port (and vice versa) so that the first bus 102 is not communicatively coupled to or, is in effect, "disconnected" or isolated from the second bus 108. Thus, while transfer node 164 is operating in the second operational mode a message 154 communicated over the first bus 102 (e.g., transmitted by communication node 158 or 159) does not reach the second bus 108 and therefore would not awaken communication nodes 152 and 153 from a low power mode (if either node was operating in a lower power mode). Similarly, while transfer node 164 is operating in the second operational mode a message communicated over the second bus 108 (e.g., transmitted by communication node 152 or 153) does not reach the first bus 102 and therefore would not awaken communication nodes 158 or 159 from a low power mode (if either node was operating in a lower power mode).

While transfer node 164 is operating in the first operational mode a message 154 communicated over the first bus 102 (e.g., transmitted by communication node 158 or 159) would reach the second bus 108 and be received by communication nodes 152 and 153 (and may awaken them from a low power mode if the nodes 152 or 153 were operating in a low power mode). Similarly, while transfer node 164 is operating in the first operational mode a message communicated over the second bus 108 (e.g., transmitted by communication node 152 or 153) would reach the first bus 102 and would be received by communication nodes 158 and 159 (and may awaken them from a low power mode if the nodes 158 or 159 were operating in a low power mode).

Figure 2:
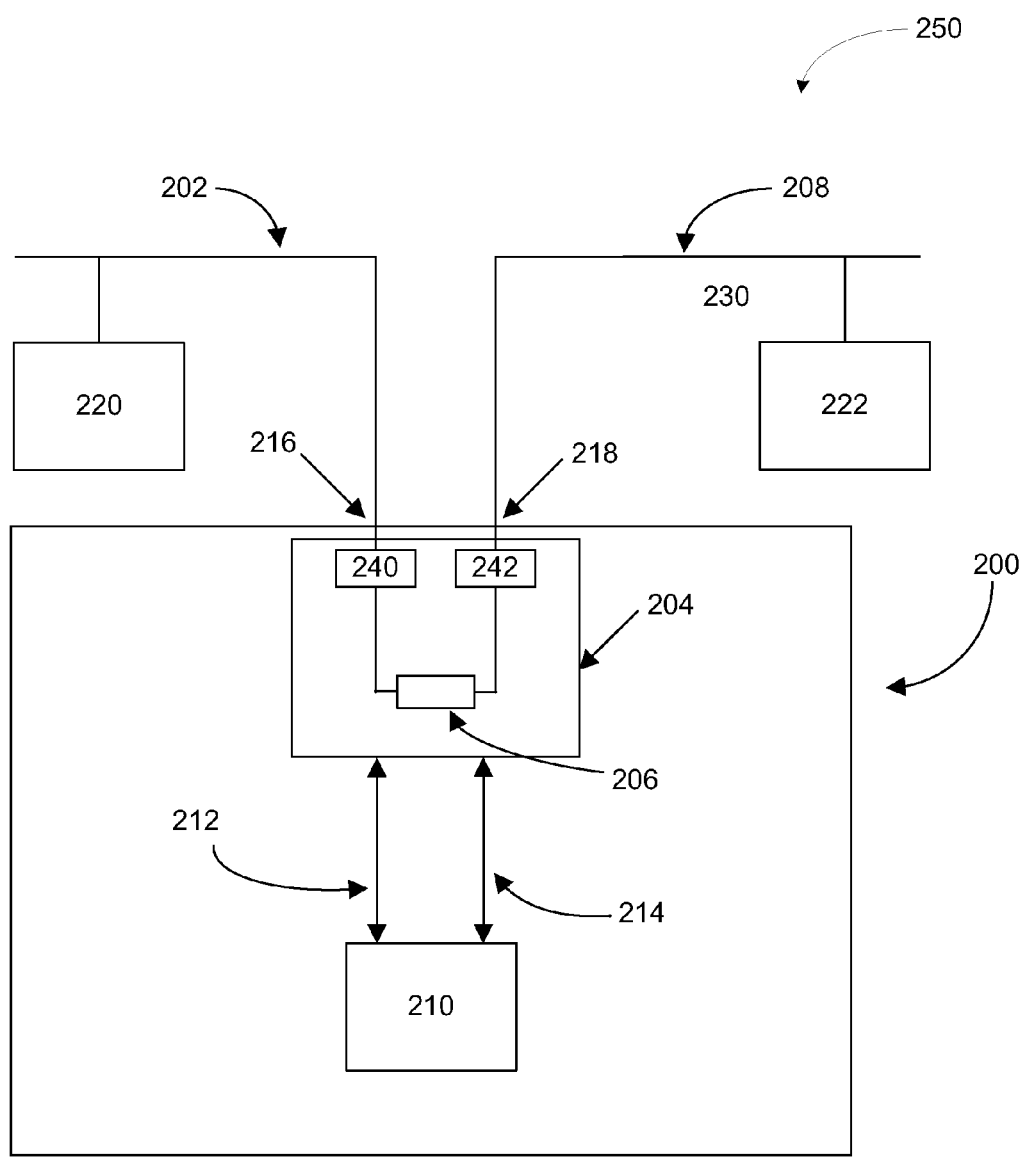
FIG. 2 is a block diagram of a communication node in accordance with an example embodiment of the present invention.

The transfer node 200 illustrated in FIG. 2 comprises an example embodiment of the transfer node 164 of FIG. 1 described above. Transfer communication node 200 is connected to a first bus 202 via a first port 216 and to a second bus 208 via a second port 218. The transfer node 200 may include a transfer component 204 that includes a first transceiver 240 connected to the first port 216 and a second transceiver 242 connected to the second port 218. This example embodiment of the transfer component 204 comprises a switch circuit 206 that selectively connects (and disconnects) transceivers 240 and 242, although other embodiments may instead include a repeater circuit.

The transfer node 200 also includes a controller 210 that is operatively coupled to transfer component 204 (to control the operational mode of the transfer component 204) and communicatively coupled to the transceiver to receive messages from and to transmit messages over the buses 202 and 208 via the transfer component 204.

The transfer component 204 may be operative to transfer signals (e.g., messages) between ports 216 and 218 in a first operational mode of the transfer node 200 (and transfer component 204) and to isolate the first port 216 and second port 218 in a second operational mode of the transfer node 200 (and transfer component 204). The controller 210 receives one or more messages from the first bus 202 and/or the second bus 208 via the transfer component 204 and, based on and in response to processing of said messages, transitions the transfer component 204 between the first and second operational modes to thereby connect (in the first operational mode) and disconnect or isolate (in the second operational mode) the two buses 202 and 208. The messages 212 received and interpreted by the controller 210 may comprise CAN signals (or alternately LIN (Local Interconnect Network)) messages)

and a signal from the controller 210 to the transfer component 204 may comprise a control signal 214 to transition the transfer component 204 between operational modes. These signals 212 and 214 may be bi-directional. While FIG. 2 separately illustrates signals 212 and 214, in some embodiments, the signals 212 and 214 may be communicated over the same (or over a portion of the same) communication path.

One or more communication nodes 220 may be connected to the first bus 202 (although only one is shown) and one or more communication nodes 222 may be connected to the second bus 208 although only one is shown. Communication nodes 220 and 222 may take the form of the communication node 159 of FIG. 1 and have a transceiver and controller and further be configured to operate in a low power mode (sleep mode) and normal mode as discussed herein.

As discussed, this example embodiment of the transfer component 204 comprises a switch circuit 206 (e.g., transistor circuit, gate, etc.) although other embodiments may instead include a repeater circuit. In this example embodiment, opening of the switch circuit 206 (to thereby operation transfer node 200 in the second operational mode), which may be performed in response to the transfer component 204 receiving one or more first control signals 214, may cause the first bus 202 and the second bus 208 to be isolated from each other so that communication nodes 222 connected to the second bus 208 do not receive signals communicated over the first bus 202. Likewise, while operating in the second operational mode, communication nodes 202 connected to the first bus 202 do not receive signals communicated over the second bus 208. As will be evident to those skilled in the art, for at least a portion of the time period during with the transfer node 200 is operating in the second operational mode, typically one or more buses of the network will include communication nodes operating in a low power mode while one or more other bus include communication nodes operating in the normal mode.

Closing of the switch circuit 206, which may be performed in response to the transfer component 204 receiving one or more second control signals 214, may cause the first bus 202 and the second bus 208 to be communicatively coupled to each other (e.g., via transceivers 240 and 242) so that communication nodes 222 receives signals transmitted over the first bus 202 and communication nodes 220 receive signals transmitted over the second bus 208.

In an embodiment in which a repeater circuit is employed instead of a switch circuit 206, the repeater circuit may comprise one bi-directional repeater or two uni-direction repeater circuits (e.g., perhaps with additional peripheral circuitry such as switches, gates, or the like) and wherein the repeater circuit is disabled in response to receiving one or more first control signals 214 and enabled in response to receiving one or more second control signals 214. In yet another embodiment, transceiver 240 and 242 are more directly communication coupled to each other (to permit signals to pass therebetween) and wherein the transceivers 240 and 242 are disabled (e.g., transmitting over either bus is disabled) in response to receiving one or more first control signals 214 and enabled (e.g., transmitting signals received by one transceiver with the other transceiver) over in response to receiving one or more second control signals 214. Other embodiments may include transfer circuit(s) other than the switch circuit 206, repeater circuit, and transceivers described herein.

Figure 3:
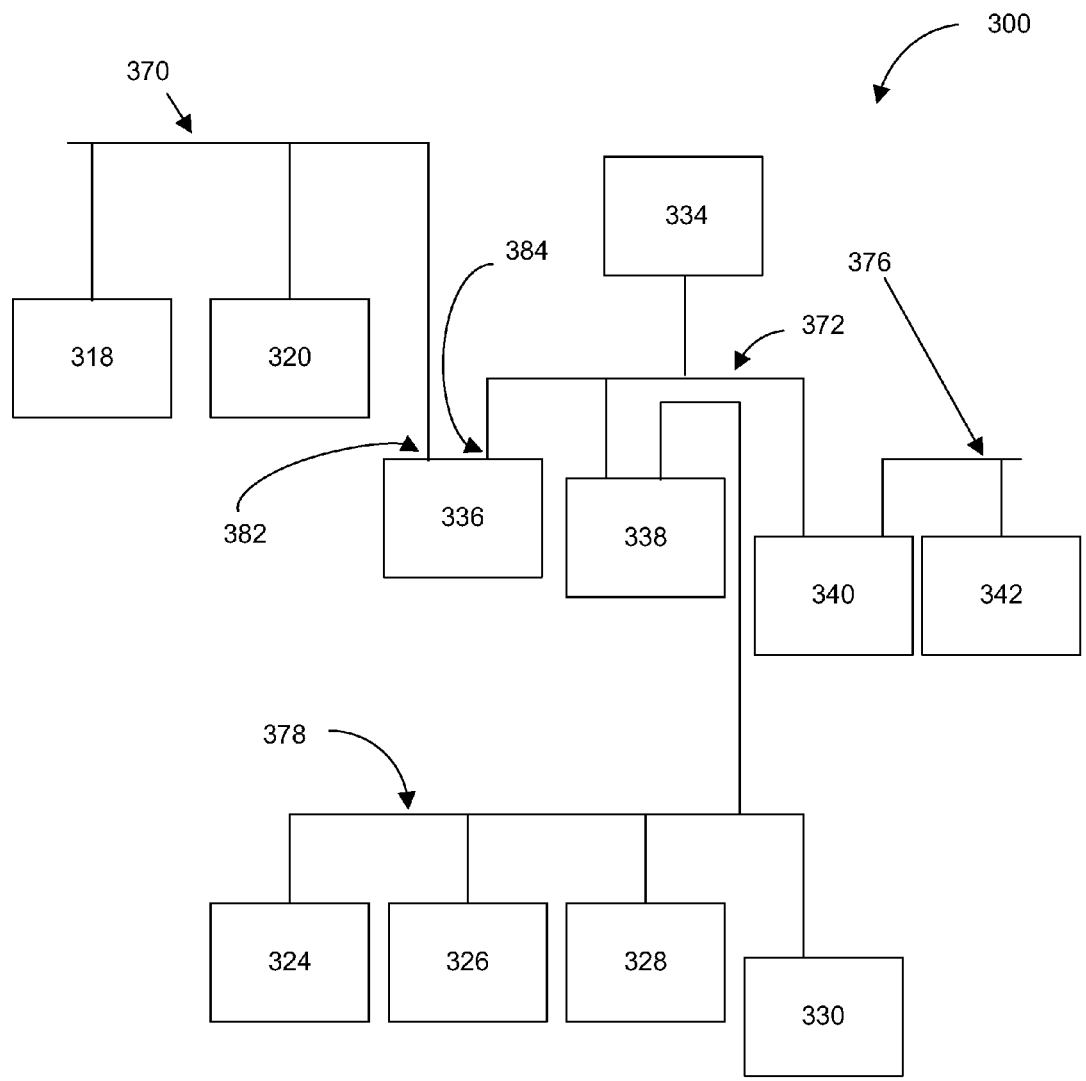
FIG. 3 is a block diagram of a communication network in accordance with another example embodiment of the present invention.

FIG. 3 is a block diagram of a network in accordance with another example embodiment of the present invention, wherein multiple transfer nodes are used to selectively connect (and partition) a plurality of buses of a network 300. In the network 300, a first transfer node 336 and communication nodes 318 and 320 are connected to first bus 370. Transfer nodes 336, 338, and 340 and communication node 334 are connected to a second bus 372. Communication node 342 and transfer node 340 are connected to a third bus 376. Communication nodes 324, 326, 328 and 330 and transfer node 338 are connected to a fourth bus 378.

The first transfer node 336 may have a first port 382 and a second port 384. Similarly, the other transfer nodes include similar first ports and second ports not labeled for the sake of simplicity and clarity. Each of transfer nodes 336, 338, and 340 may take the form of the transfer node 200 of FIG. 2 and operate in a manner substantially similar to transfer node 200 and, therefore, operate in a first operational mode in which the transfer node communicatively couples its respective buses and in a second operational mode in which the transfer node isolates its respective buses. Thus, transfer node 336 selectively communicatively couples and isolates buses 370 and 372. Transfer node 338 selectively communicatively couples and isolates buses 372 and 378. Transfer node 340 selectively communicatively couples and isolates buses 376 and 378.

Each of the transfer nodes 336, 338, and 340 may operate individually in that any one or more of the transfer nodes may operate in the first or second operational node irrespective of the operational mode in which any of the other transfer nodes operate. The operational modes of the transfer nodes 336, 338 and 340 may be coordinated, of course, by the messages communicated over the buses (to which the controllers of the transfer nodes respond) to permit the communication nodes connected to one or more buses to remain in a low power mode while facilitating communication over and/or between other of the buses by other communication nodes operating in the normal (higher power) mode.

In an example scenario in which transfer node 336 is operating in the first operational node and transfer nodes 338 and 340 are operating in the second operational node, messages communicated by communication nodes 318 and 320 are isolated from buses 376 and 378 so that such messages do not (unnecessarily) awaken any of communication nodes 324, 326, 328, 330 connected to bus 378 or communication node 342 connected to bus 376 from a low power mode. However, such messages communicated over the first bus 370 are transferred by transfer node 336 to the second bus 372 and received by communication node 334, which also may transmit messages over the second bus 372, which are transferred by transfer node 336 to the first bus 370 and received by communication nodes 318 and 320.

In another example scenario in which all of the transfer nodes are operating in the first operational node, messages communicated by any communication node are transferred to all of the other buses by the transfer nodes. It is worth noting that in such a scenario, a message transmitted onto the first bus 370 will be transferred by transfer nodes 336 and 340 to the third bus 376 and transferred by transfer nodes 336 and 338 to the fourth bus 378. Thus, some messages may undergo a plurality of transfers by a plurality of transfer nodes and traverse two, three or more buses.

Figure 4:
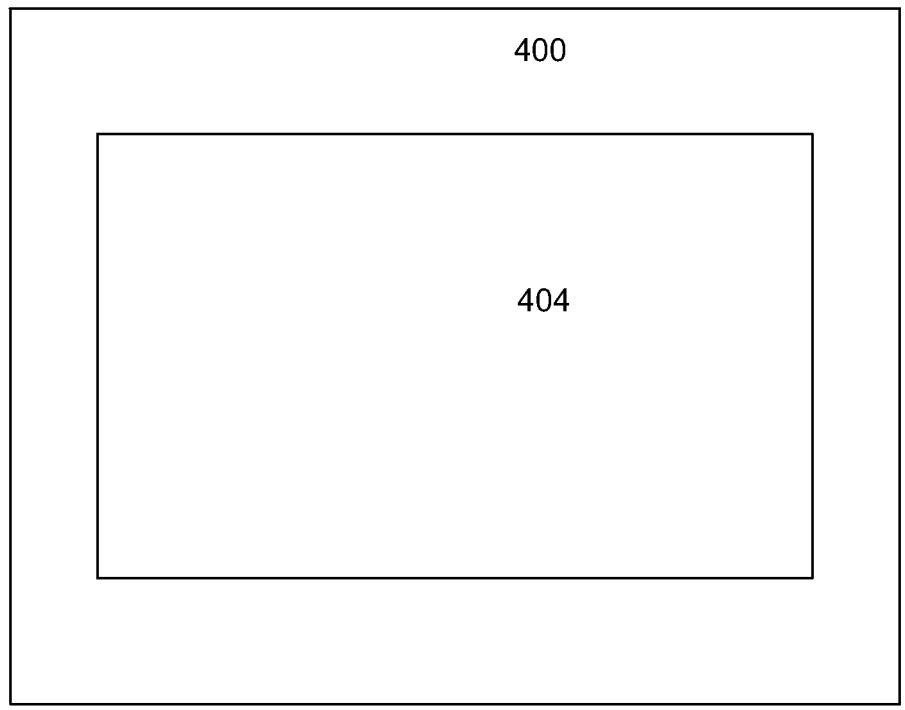
FIG. 4 illustrates an enlarged plan view of a semiconductor device in accordance with an example embodiment of the present invention.

Networks and transfer nodes of some embodiments of the present invention may be formed as a semiconductor device. FIG. 4 illustrates an enlarged plan view of a semiconductor device that may include an embodiment of the transfer node 200 of FIG. 2 and/or the network 300 of FIG. 3 in accordance with an example embodiment of the present invention. For example, a semiconductor die 400 may include a transfer node 404 (and in some embodiments the surrounding buses and communication nodes). The semiconductor die 400 may also include other circuits that are not shown in FIG. 4 for simplicity of the drawing.

Figure 5:
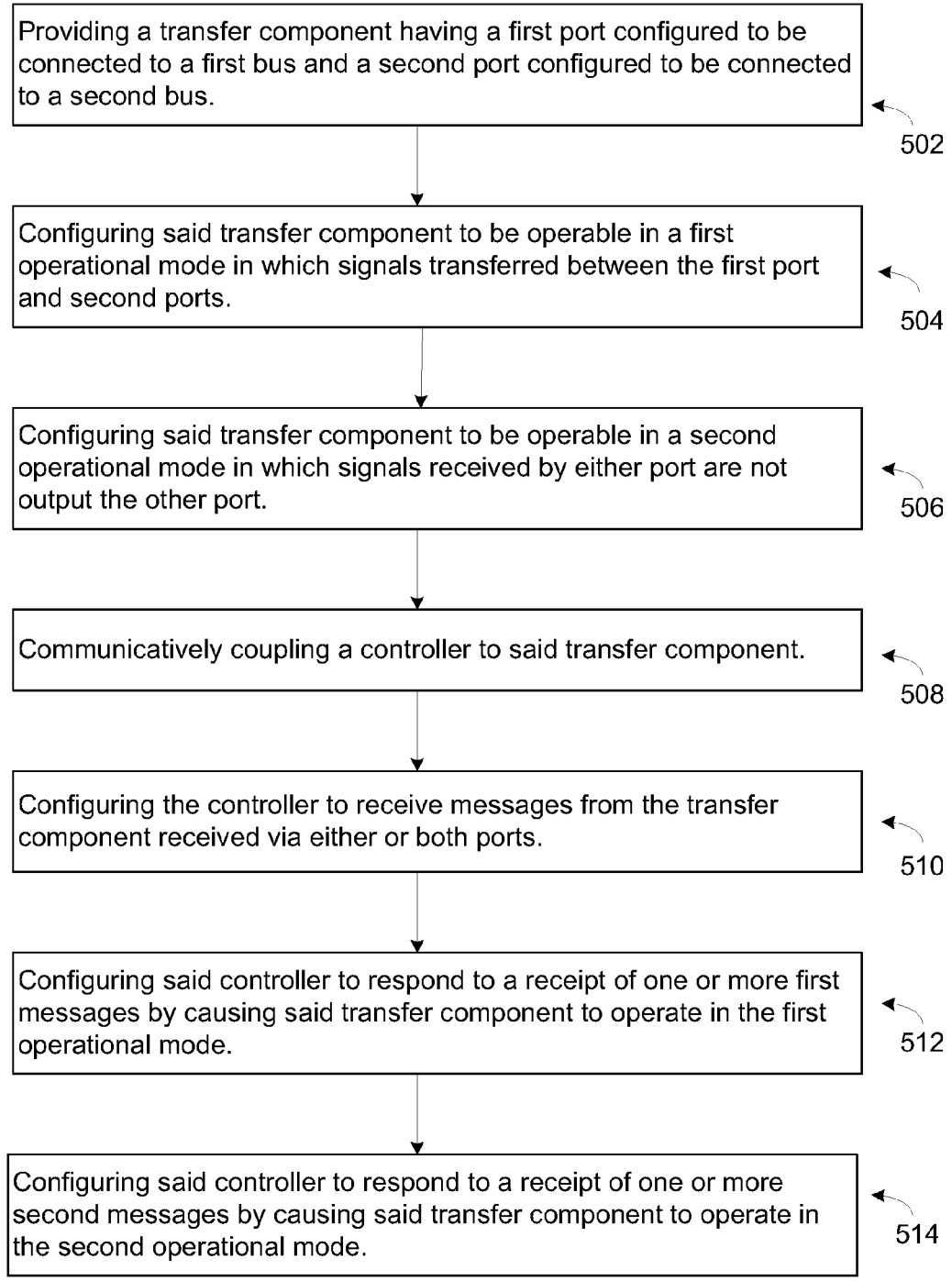
FIG. 5 illustrates a method of forming a communication node in accordance with an example embodiment of the present invention.

FIG. 5 illustrates a method 500 of making a transfer node in accordance with an example embodiment of the present invention. As illustrated in FIG. 5, an example embodiment of a method of forming a device, such as transfer node 200, for providing communications between multiple buses may include at 502 providing a transfer component having a first port configured to be connected to a first bus and a second port configured to be connected to a second bus. At 504 the process may include configuring the transfer component to be operable in a first operational mode in which signals received by either port are transferred to (and output from) the other port. At 506 the process may include configuring the transfer component to be operable in a second operational mode in which signals received by either port are not output the other port.

The method 500 may also comprise communicatively coupling a controller to the transfer component at 508. At 510 the process may include configuring the controller to receive messages from the transfer component received via the first port (and/or second port) and configuring the controller to respond to a receipt of one or more first messages by causing the transfer component to operate in the first operational mode at 512. At 514 the process may also include configuring the controller to respond to receipt of one or more second messages by causing the transfer component to operate in the second operational mode.

In the method 500, the first port may comprise (or be connected to) a first transceiver configured to communicate over the first bus and the second port may comprise (or be connected to) a second transceiver configured to communicate over the second bus, and wherein said first transceiver and said second transceiver may be configured for bi-directional communication with each other in the first operational mode.

Further, in the method 500, the transfer component may comprise a repeater communicatively coupling the first port to the second port, and the method may further comprise enabling the repeater in the first operational mode, and disabling the repeater in the second operational mode. The repeater may further comprise a CAN (Controller Area Network) repeater. The foregoing method may further comprise connecting the CAN repeater to the controller wherein the controller may be configured to process one or more CAN signals and one or more CAN repeater control signals.

The method 500 may further comprise configuring the controller to interpret and respond to the one or more first and second messages that may comprise CAN messages and/or a LIN (Local Interconnect Network) messages.

While the embodiments of the transfer nodes described above include two ports, other embodiments may include three ports, with each port configured to be connected to a different bus and wherein the transfer component is configured to selectively connect all three buses, any two buses, or to isolate all three buses from each other in response to receiving control signals from the controller. Other embodiments may have four, five or more ports for connection to four, five, or more buses and selectively communicatively couple any combination (or all) of the buses as discussed herein. Various references are used herein related to transferring signals received via one port to (and output from) the another port (of one, two or more ports). Such references are meant to include regenerating and outputting the signal, amplifying and outputting the signal, conducting the signal output, and/or otherwise conveying at least some of the received information out the other port. In the description above, the controller and transfer component of a transfer node are described as separate components. However, in practice the functionality of these components may be integrated into the same physical component (wholly or partially). Thus, the description of the controller and transfer component of the transfer nodes herein is meant to describe functions that may or may not be separate physical components.

The "wake up" messages (e.g., CAN, LIN, etc.) that are received by the controller of the transfer node from one bus may be output onto to the other bus in order to wake up the communication nodes connected to the other bus. Alternately, other information may be transmitted over the other bus in response to receiving the message(s).

The "sleep" messages (e.g., CAN, LIN, etc.) that are received by the controller of the transfer node from one bus may be output onto to the other bus in order to cause the communication nodes connected to the other bus to transition to low power mode. Alternately, other information may be transmitted over the other bus in response to receiving the message(s).

One example embodiment comprises a device for providing communications between a first bus and a second bus and wherein a plurality of first communication nodes are connected to the first bus and a plurality of second communication devices are connected to the second bus and wherein the plurality of first communication devices and the plurality of second communication devices are operable in a first low power mode and operable in a second mode in which the communication node consumes more power than in the first low power mode. The device may comprise a transfer component having a first port configured to be connected to the first bus and a second port configured to be connected to the second bus. The transfer component may be operable in a first operational mode in which signals received via the first port are output the second port and operable in a second operational mode in which signals received via the first port are not output the second port. The device may include a controller communicatively coupled to the transfer component and configured to receive one or more messages from the transfer component received via the first port. The controller may be configured to cause said transfer component to operate in the first operational mode in response to receipt of one or more first messages; and configured to cause said transfer component to operate in the second operational mode in response to receipt of one of more second messages. The transfer component may comprise a switch circuit or a repeater circuit (which may be enabled in the first operational mode and disabled in the second operational mode) disposed between the first port and the second port. Alternately or additionally, the transfer component may comprises a first transceiver communicatively coupled to the first port to communicate over the first bus and a second transceiver communicatively coupled to the second port to communicate over the second bus and wherein the first and second transceivers are configured for bi-directional communication with each other in the first operational mode. The one or more first messages may comprise at least one CAN message or may comprise at least one LIN (Local Interconnect Network) message.

In yet another embodiment, a method of forming a device for providing communications comprises providing a transfer component having a first port configured to be connected to a first bus and having a second port configured to be connected to a second bus; configuring the transfer component to be operable in a first operational mode in which the first port is communicatively coupled to the second port; configuring the transfer component to be operable in a second operational mode in which the first port is communicatively isolated from the second port; communicatively coupling a controller to the transfer component; configuring the controller to receive messages from the transfer component received via at least one of the first port and the second port; configuring the controller to respond to receipt of one or more first messages by causing the transfer component to operate in the first operational mode; and configuring the controller to respond to receipt of one or more second messages by causing the transfer component to operate in the second operational mode. The first port may comprise a first transceiver configured to communicate over the first bus and the second port comprises a second transceiver configured to communicate over the second bus; and wherein the first transceiver and the second transceiver are configured for bi-directional communication with each other in the first operational mode. The transfer component may comprise a repeater circuit communicatively coupling the first port to the second port, the method further comprising enabling the repeater circuit in the first operational mode; and disabling the repeater circuit in the second operational mode.

In yet another embodiment, a system for providing communications may comprise a first bus; a plurality of first communication nodes connected to the first bus; a second bus; and a plurality of second communication nodes connected to the second bus. Each of the plurality of first and second communication nodes may be configured to operate in at least a first state and a lower power state and wherein operation in the lower power state consumes less power than operation in the first state. The system may include a transfer component connected to the first bus and the second bus. The transfer component may be operable in a first operational mode in which the first bus is communicatively coupled to the second bus. The transfer component may be operable in a second operational mode in which the first bus is communicatively isolated form the second bus. The system may be operable in a first mode in which: (a) two or more of the plurality of first communication nodes communicate over the first bus while operating in the first state, concurrently with (b) the plurality of second communication nodes operate in the lower power state and the transfer component operates in the second operational mode. They system may be operable in a second mode in which one of the plurality of first communication nodes communicate over the first bus and the second bus with one of the plurality of second communication nodes while the transfer component operates in the first operational mode.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. Rather, the invention extends to all functionally equivalent structures, methods and uses within the scope of the appended claims. Those skilled in the art, having the benefit of the teachings of this specification, may effect numerous modifications thereto and changes may be made without departing from the scope and spirit of the invention.

As the claims hereinafter reflect, inventive aspects may lie in less than all features of a single foregoing disclosed embodiment. Thus, the hereinafter expressed claims are hereby expressly incorporated into this Detailed Description, with each claim standing on its own as a separate embodiment of an invention. Furthermore, while some embodiments described herein include some but not other features included in other embodiments, combinations of features of different embodiments are meant to be within the scope of the invention, and form different embodiments, as would be understood by those skilled in the art.

What is claimed is:

1. A device for providing communications between a first bus and a second bus and wherein a plurality of first communication nodes are connected to the first bus and a plurality of second communication nodes are connected to the second bus and wherein the plurality of first communication nodes and the plurality of second communication nodes are operable in a low power mode and operable in a second mode in which the communication node consumes more power than in the low power mode, the device comprising:
   a transfer component having a first port configured to be connected to the first bus and a second port configured to be connected to the second bus, and a switch circuit coupled between the first port and the second port;
   said transfer component operable in a first operational mode in which the switch circuit is closed to couple signals received via the first port to the second port to be output the second port;
   said transfer component operable in a second operational mode in which the switch circuit is open to communicatively isolate signals received on the first port from the second port so that no signals received via the first port are coupled to the second port and are not output the second port;
   a controller communicatively coupled to said transfer component and configured to receive one or more messages from the transfer component received via the first port;
   said controller configured to cause said switch circuit to operate in the first operational mode in response to receipt of one or more first messages; and
   said controller configured to cause said switch circuit to operate in the second operational mode in response to receipt of one or more second messages.

2. The device of claim 1, wherein said transfer component comprises:
   a first transceiver communicatively coupled to said first port to communicate over the first bus and a second transceiver communicatively coupled to said second port to communicate over the second bus; and
   wherein said first transceiver and said second transceiver are configured for bi-directional communication with each other in said first operational mode.

3. The device of claim 1, wherein the one or more first messages comprise at least one LIN (Local Interconnect Network) message.

4. The device of claim 1, wherein said switch circuit when open isolates the second port from the first port.

5. A method of forming a device for providing communications, comprising:
   providing a transfer component having a first port configured to be connected to a first bus and having a second port configured to be connected to a second bus;
   configuring the transfer component to be operable in a first operational mode in which the first port is communicatively coupled to the second port;
   configuring the transfer component to be operable in a second operational mode in which the first port is communicatively isolated from the second port wherein no messages from the first port are coupled to the second port;
   communicatively coupling a controller to the transfer component;

configuring the controller to receive messages from the transfer component received via at least one of the first port and the second port;

configuring the controller to respond to receipt of one or more first messages by causing the transfer component to operate in the first operational mode; and configuring the controller to respond to receipt of one or more second messages by causing the transfer component to operate in the second operational mode.

6. The method of claim 5, wherein the transfer component comprises a repeater circuit disposed between the first port and the second port.

7. The method of claim 5, wherein the first port comprises a first transceiver configured to communicate over the first bus and the second port comprises a second transceiver configured to communicate over the second bus; and wherein the first transceiver and the second transceiver are configured for bi-directional communication with each other in the first operational mode.

8. The method of claim 5, wherein the transfer component comprises a repeater circuit communicatively coupling the first port to the second port; the method further comprising:

enabling the repeater circuit in the first operational mode; and disabling the repeater circuit in the second operational mode.

9. The method of claim 8, wherein the repeater circuit comprises a CAN (Controller Area Network) repeater circuit.

10. The method of claim 9, wherein the transfer component comprises a switch circuit disposed between the first port and the second port.

11. The method of claim 5, wherein at least one of the one or more first messages comprises a CAN signal.

12. The method of claim 5, wherein at least one of the one or more first messages comprises a LIN (Local Interconnect Network) message.

13. The method of claim 5 wherein configuring the controller to respond to receipt of one or more second messages by causing the transfer component to operate in the second operational mode includes causing the transfer component to not output messages on the second port in the second operation mode.

14. A system for providing communications, comprising:
a first bus;
a plurality of first communication nodes connected to said first bus;
a second bus;
a plurality of second communication nodes connected to said second bus;
each of said plurality of first and second communication nodes configured to operate in at least a first state and a lower power state;
wherein operation in the lower power state consumes less power than operation in the first state;
a transfer component connected to said first bus and said second bus;
said transfer component operable in a first operational mode in which said first bus is communicatively coupled to said second bus;
said transfer component operable in a second operational mode in which said first bus is communicatively isolated from said second bus wherein all signals received on the first bus are not transmitted to the second port and wherein at least one of the second communication nodes remains in the lower power state;
said system operable in a first mode in which:
(a) two or more of the plurality of first communication nodes communicate over the first bus while operating in the first state, concurrently with
(b) the plurality of second communication nodes operate in the lower power state and the transfer component operates in the second operational mode; and
said system operable in a second mode in which one of the plurality of first communication nodes communicate over the first bus and the second bus with one of the plurality of second communication nodes while the transfer component operates in the first operational mode.

15. The system of claim 14, wherein the transfer component comprises a first transceiver configured to communicate over the first bus and said transfer component comprises a second transceiver configured to communicate over the second bus; and wherein said first transceiver and said second transceiver are configured for bi-directional communication with each other in the first operational mode of the transfer component.

16. The system of claim 14, wherein the transfer component comprises a switch circuit.

17. The system of claim 14 wherein two or more of the plurality of first communication nodes communicate over the first bus but not to one or more of the plurality of second communication nodes, while operating in the first state.

* * * * *